United States Patent
Fauret (10) Patent No.: US 7,337,623 B2
(45) Date of Patent: Mar. 4, 2008

(54) FUZZY-LOGIC BASED CONTROLLER TO REGULATE AIRCRAFT TEMPERATURE

(75) Inventor: Jean Remy Fauret, Hamburg (DE)

(73) Assignee: Airbus Deutschland GmbH (DE)

( * ) Notice: Subject to any disclaimer, the term of this patent is extended or adjusted under 35 U.S.C. 154(b) by 416 days.

(21) Appl. No.: 11/020,895

(22) Filed: Dec. 23, 2004

(65) Prior Publication Data
US 2006/0065753 A1 Mar. 30, 2006

(30) Foreign Application Priority Data
Dec. 29, 2003 (DE) .................. 103 61 381

(51) Int. Cl.
*F25D 17/00* (2006.01)
(52) U.S. Cl. ............... 62/180; 62/186; 62/229; 62/DIG. 5; 236/1 C
(58) Field of Classification Search .......... 62/126, 62/127, 129, 132, 231, 239, 244, DIG. 5, 62/229, 180, 186
See application file for complete search history.

(56) References Cited

U.S. PATENT DOCUMENTS

| | | | | |
|---|---|---|---|---|
| 2,937,011 | A | * | 5/1960 | Brahm ................ 165/203 |
| 4,445,342 | A | * | 5/1984 | Warner ................ 62/172 |
| 4,735,056 | A | * | 4/1988 | Goodman ............. 62/172 |
| 5,410,890 | A |   | 5/1995 | Arima |
| 5,440,891 | A | * | 8/1995 | Hindmon et al. ........ 62/117 |
| 5,931,376 | A |   | 8/1999 | Meyer |
| 5,937,941 | A | * | 8/1999 | Gach ................... 165/204 |
| 6,619,589 | B2 | * | 9/2003 | Brasseur et al. ....... 244/118.5 |

FOREIGN PATENT DOCUMENTS

| | | |
|---|---|---|
| DE | 33 30 556 A1 | 8/1982 |
| DE | 197 00 964 C2 | 6/1999 |
| DE | 198 42 174 A1 | 3/2000 |
| WO | WO-96/20109 A1 | 7/1996 |

OTHER PUBLICATIONS

Recknagel, Springer, Schramek, "Taschenbuch für Heizung + Klimatechnik", Jan. 2002, pp. 342-345, 1352-1367.

* cited by examiner

*Primary Examiner*—Frantz Jules
*Assistant Examiner*—Huseyin Koca
(74) *Attorney, Agent, or Firm*—Lerner, David, Littenberg, Krumholz & Mentlik, LLP (57) ABSTRACT

Temperature regulation by means of a PID regulation method can be associated with disadvantageous oscillations, overshooting and long control times. According to an exemplary embodiment of the present invention, during temperature regulation of a space, non-linear fuzzy logic is provided which for intelligent temperature regulation uses extensive information from the environment. Such information includes in particular the temperature in the air inlet duct upstream of the heater, and the rate of change in the temperature in the air inlet duct upstream of the heater and in a first cell of the space. In this way, a fast and precise temperature regulating system may be provided which largely prevents or suppresses undesirable oscillations.

20 Claims, 7 Drawing Sheets

FUZZY-LOGIC BASED CONTROLLER TO REGULATE AIRCRAFT TEMPERATURE

BACKGROUND OF THE INVENTION

The present invention relates to a temperature control system. In particular, the present invention relates to a method for controlling the temperature in a space comprising one or more cells, a controlling device for controlling the temperature in a space comprising one or more cells, and a computer program for controlling a heating system.

In the case of commercial aircrafts, incoming air is channelled through a heater and is correspondingly heated before it enters a space whose temperature is to rise. This space can for example be a compartment which houses the seats for passengers.

The air introduced into the heater is in known devices and methods intermixed from air emanating from an air mixer and from air emanating from a bleed air compressor. This intermixture is regulated by a so-called trim adjustment valve (TAV). Both the trim adjustment valve and the heater are controlled by way of their own regulating loop, with the use of a PID method (Proportional, Integral, Derivative). It is believed that this is associated with a disadvantage in that the air coming into the heater by way of the trim adjustment valve reacts very much faster to being regulated than the heater can react to heating regulation. This may thus lead to undesirable fluctuations in the temperature at the heater outlet, or the temperature at the heater outlet can shoot above its desired value.

Such devices and methods for regulating the temperature in a space may be associated with a further disadvantage in that the heater reacts only slowly to a fluctuation in the temperature of the incoming air, for example indirectly by way of a resulting fluctuation in the temperature of the space whose temperature is to be regulated.

SUMMARY OF THE INVENTION

According to an exemplary embodiment of the present invention, a method for controlling the temperature in a space comprising one or a plurality of cells is provided, wherein controlling the temperature is performed by means of a heating system comprising at least one controlling device, and wherein the method comprises the steps of: measuring regulated quantities or set variables comprising a rate of change in the temperature in a first cell; calculating control variables for controlling the at least one controlling device on the basis of the measured set variables, wherein calculation of the control variables is performed by means of non-linear fuzzy logic within a control circuit with the use of the measured set variables; transferring the calculated control variables to the at least one controlling device; and controlling the temperature of air which is introduced into the cells of the space by the at least one controlling device with the use of the calculated control variables or quantities.

It is believed that this exemplary embodiment of the present invention may provide for a utilization of the non-linearity of a fuzzy control, wherein an output value may vary even if the difference between two controlled quantities, which are used for calculating the output value (the control variable), is constant. This may not be possible with a PID control system. Furthermore, the control circuits may be designed in the form of a feed-forward closed-loop regulation circuit so that fast control and/or regulation may be achieved.

According to another exemplary embodiment of the present invention, the heating system comprises a first regulating or controlling device, a second regulating or controlling device and a control device or controller. The first regulating device is a trim adjustment valve for controlling or regulating the inlet rates of air from an air mixer and of air from a bleed air compressor, and the second regulating device is a heater for heating the air from the trim adjustment valve. The control device (or controller) is used for controlling the trim adjustment valve, or for controlling the heat output of the heater.

The heat output may thus be influenced by means of two controlling or regulating devices. On the one hand the air which flows into the space may be brought to a desired temperature directly by being heated up in the heater; on the other hand there may also be the option of changing the temperature of the inflowing air by corresponding control of the air mixer in that the mixing ratio between cold air from an air mixer and hot air from a bleed air compressor is varied. In particular, the air pressure in the cells may be set by controlling or regulating the trim adjustment valve.

According to a further exemplary embodiment of the present invention, the measured regulated quantities comprise one or several of the following quantities: a temperature in the air inlet duct upstream of the heater, a temperature within the heater, a temperature in a first cell, a desired temperature in the first cell, a rate of change in the temperature in the first cell, and a rate of change in the temperature in the air inlet duct upstream of the heater.

By reading out various measured set variables or regulated quantities within the temperature regulating (controlling) circuit, various controlling or regulating scenarios may be possible which take into account various external circumstances such as, for example, the temperature in the air inlet duct upstream of the heater and the desired temperature in the first cell or the temperature within the heater and the rate of change in the temperature in the first cell. Thus, in particular in conjunction with non-linear fuzzy logic, situation-specific fast-reacting controlling or regulating mechanisms which match the particular task may be provided.

According to a further exemplary embodiment of the present invention, non-linear fuzzy logic for calculating the control variables from the set variables is based on AND operations and centroid methods. Advantageously, this process may provide for a fast, effective and flexible method for calculating the control variables.

In another exemplary embodiment of the present invention, a controlling apparatus for controlling the temperature in a space comprising one or a plurality of cells is set forth, wherein the controlling apparatus comprises: a heating system with at least one controlling or regulating device; at least one sensor for measuring set variables, comprising a rate of change in the temperature in a first cell, a processor for calculating control variables for controlling the at least one regulating device on the basis of the measured set variables, wherein calculation of the control quantities is performed by means of non-linear fuzzy logic within a control circuit with the use of the measured set variables, and at least one data transmission means for the transfer of the calculated control variables to the at least one controlling device, wherein the at least one controlling or regulating device is adapted for controlling the temperature of air introduced into the cells of the space with the use of the calculated control variables.

It is believed that this controlling apparatus may be integrated into a commercial aircraft and may be adapted to set the temperature in various cells. These cells may for example comprise the cockpit, sanitary cells, and seating areas for the aircrew and passengers. By using non-linear fuzzy logic within the controlling circuit and a multitude of regulated quantities or set variables for calculating the control variables, which are used for controlling the controlling devices, for example fluctuations in the temperature of the incoming air can advantageously be incorporated into the calculation of the control variables, and fast and effective temperature control and/or regulation may be provided.

According to another exemplary embodiment of the present invention, a computer program for controlling a heating system comprising at least one controlling or regulating device for controlling or regulating the temperature in a space comprising one or a plurality of cells is provided, wherein the computer program, when it is executed on a processor, instructs the processor to carry out at least the following operations: retrieving of measured regulated quantities (set variables) comprising a rate of change in temperature in a first cell, calculating control quantities (control variables) for controlling the at least one regulating (controlling) device on the basis of the measured regulated quantities, wherein calculation of the control quantities is performed by means of non-linear fuzzy logic within a regulation (control) circuit with the use of the measured regulated quantities, transferring of the calculated control quantities to the at least one regulating device for regulating the temperature of air which is introduced into the cells of the space by the at least one regulating device with the use of the calculated control quantities.

Further objectives, exemplary embodiments and advantages of the invention are set out in the dependent claims and in the following description.

BRIEF DESCRIPTION OF THE DRAWINGS

Below, the invention is described in more detail by means of exemplary embodiments, with reference to the drawings.

DETAILED DESCRIPTION

Figure 1:
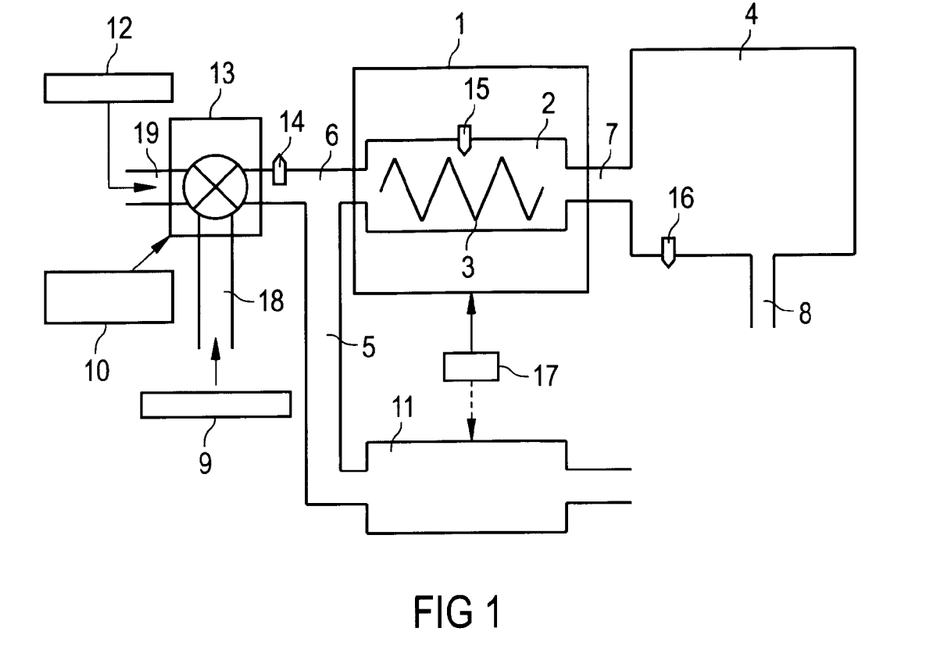
FIG. 1 is a diagrammatic representation of a controlling or regulating device for controlling the temperature in a space.

FIG. 1 is a diagrammatic representation of a regulating device for regulating the temperature in a space comprising one or several cells 4. The incoming air from an air mixer 12 and a bleed air compressor 9 is intermixed by means of a trim adjustment valve 13, wherein the trim adjustment valve 13 regulates the fractions of hot air emanating from the bleed air compressor 9 and cold air emanating from the air mixer 12. Furthermore, the trim adjustment valve 13 regulates the quantity passing through and thus the pressure in the cell 4. The trim adjustment valve 13 is controlled by means of the control device 10 which comprises a processor.

The airflow, which has been set by means of the trim adjustment valve 13, is now led into a heater 1 by means of the pipeline or duct 6. In its heating chamber 2, the heater 1 comprises heating elements 3 so that the air flowing through can be heated. Such heaters 1 are well known in the state of the art and are not described in further detail below.

After leaving the heater 1, the air, which may have been heated, is introduced into the cell 4 by way of the pipeline 7. Cell 4 may for example be the passenger compartment in a commercial aircraft or the cockpit or a sanitary cell in a commercial aircraft. Furthermore, the cell 4 may be connected to further cells by way of a connection 8.

It should be noted that further heaters 11 may also be provided which are connected to the incoming air from the trim adjustment valve by way of inlet pipelines 5. These further heaters are then correspondingly connected to further cells which are supplied with the air which may be heated.

Various measuring devices or sensors 14, 15, 16 for measuring regulated quantities are provided. Measuring device 14 is designed for measuring the temperature in the air inlet duct 6 upstream of the heater, and for measuring any rate of change in the temperature in the air inlet duct 6 upstream of the heater. Measuring device 15 is designed for measuring the temperature of the air within the heater 1, and for measuring any rate of change in the temperature of the air in the heater 1. Measuring device 16 is designed for measuring the temperature in the first cell, and for measuring any rate of change in the temperature in the first cell 4. Additional measuring devices may also be provided, e.g. thermometers in the further cells 11, or measuring devices for measuring physical quantities in the inlet channels 18, 19 upstream of the trim adjustment valve 13. Furthermore, apart from the temperature and the rate of change in the temperature, the physical quantities may also contain other quantities, such as e.g. the flow speed of the air, the air pressure, humidity or oxygen content of the air, or other quantities These measured data are then transferred to the control devices 10, 17. Transferring the measured data or regulated quantities is performed by way of data transmission lines or a wireless connection (not shown in FIG. 1). The control device 17 regulates the heat output of the heater 1. In cases where several heaters 1, 11 are provided, the control device 17 also regulates the heat output of the additional heaters 11, or other additional control devices are provided (not shown in FIG. 1). It should be noted that the control devices 10 and 17 may also be integrated in a single control device, which may for example be contained in the form of an integrated circuit or a processor with a corresponding periphery (not shown in FIG. 1).

The desired temperature in cell 4 or in some other cell is a further quantity to be measured which is of importance in regulating the temperature. This regulated quantity is transmitted to the control devices 10, 17 for example in the form of a manual user input.

The trim adjustment valve 13 is for example designed in the form of a butterfly valve, comprises a diameter of approximately 3.08 cm (2 inches) and is adjusted by way of a stepper motor.

The control device 17 for the heater receives the temperature which has been measured in the cell 4 by way of sensor 16 and compares the measured temperature with a desired-value temperature, which value has for example been manually specified by a member of the aircrew. The cell temperature or cabin temperature of the respective cell is then set according to the desired value. In a first step this takes place by way of calculating the air supply to the heater, which air supply is set by way of the trim adjustment valve 13. This procedure is carried out in a first control loop. In a second control loop or closed-loop regulation circuit, the temperature of the heated air is controlled in that the temperature sensor 15 in the heater 1 is read out by the control device 17, and the heat output of the heater 1 is regulated accordingly.

Figure 2:
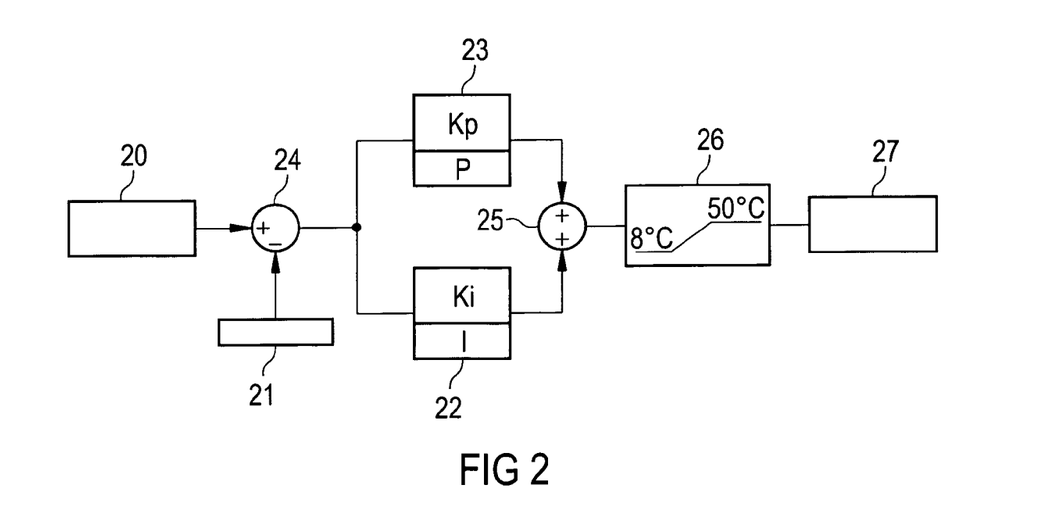
FIG. 2 is a diagrammatic representation of a PID method for calculating the desired value of the temperature in an air inlet duct with limitation.

FIG. 2 shows a PID method for calculating the desired value of the temperature in an air inlet duct with temperature limitation (PID=Proportional, Integral, Differential). PID control devices are adapted such that if they are responsible for maintaining a particular state, e.g. a temperature in a cell, they do not have to continually readjust, but instead manage with a limited number of discrete readjustments. Examples of a PID control include the cruise control in a vehicle, the thermostat in a domestic environment or in an aircraft in which the interior temperature is to be kept at a largely constant value.

In the PID regulation described in this document, the actual temperature in a cell 21 is compared with the desired temperature in this cell 20. The error in the temperature, or the temperature difference calculated therefrom, is used as an input signal for a proportional-integral algorithm which generates a principally unlimited desired value for the temperature in the heater 1 (see FIG. 1). In this arrangement, the comparison between the desired temperature 20 and the actual temperature 21 is carried out in the comparator 24 and the proportional-integral algorithm is carried out in the components 22, 23, 25. This is followed by an upward or downward limitation of the output temperature value by limitation element 26. After this, a limited desired temperature of the air in the heater is output by way of output element 27. In the method shown in FIG. 2, the limited desired temperature is between 8° C. and 50° C.

Figure 3:
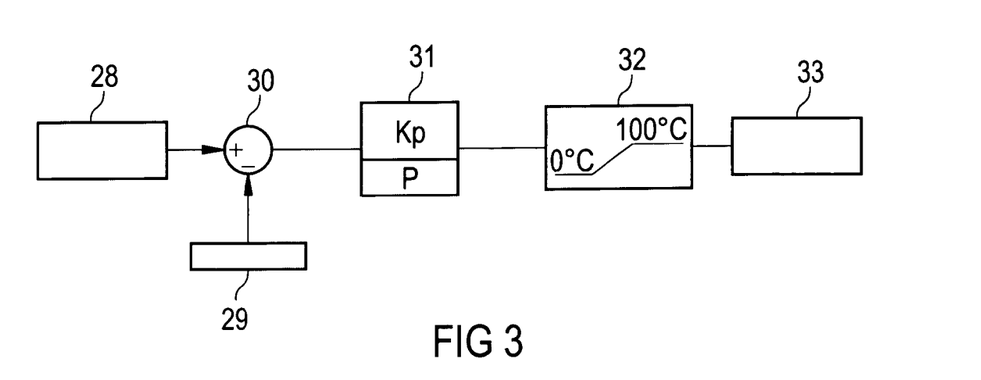
FIG. 3 is a diagrammatic representation of a PID method for calculating the desired value of the heat output, on the basis of the desired value of the temperature in an air inlet duct with limitation.

FIG. 3 shows a PID method for calculating the desired value of a heat output with the use of the desired value of the temperature in an air inlet duct 7 or within the heater 2 with a corresponding temperature limitation. The desired value of the temperature 28 from the output element 27 (see FIG. 2) is compared, in the comparator 30, with the actual temperature 29 within the heater 2. In this process, the actual temperature within the heater 2 is measured by way of the temperature sensor 15 (see FIG. 1). From this, the comparator 30 calculates an error, which subsequently runs through a proportional algorithm 31. A limitation 32 is then imposed on the resulting control value. In this way a control quantity 33 results as a output value, which control quantity 33 regulates the power input of the heater.

Figure 4:
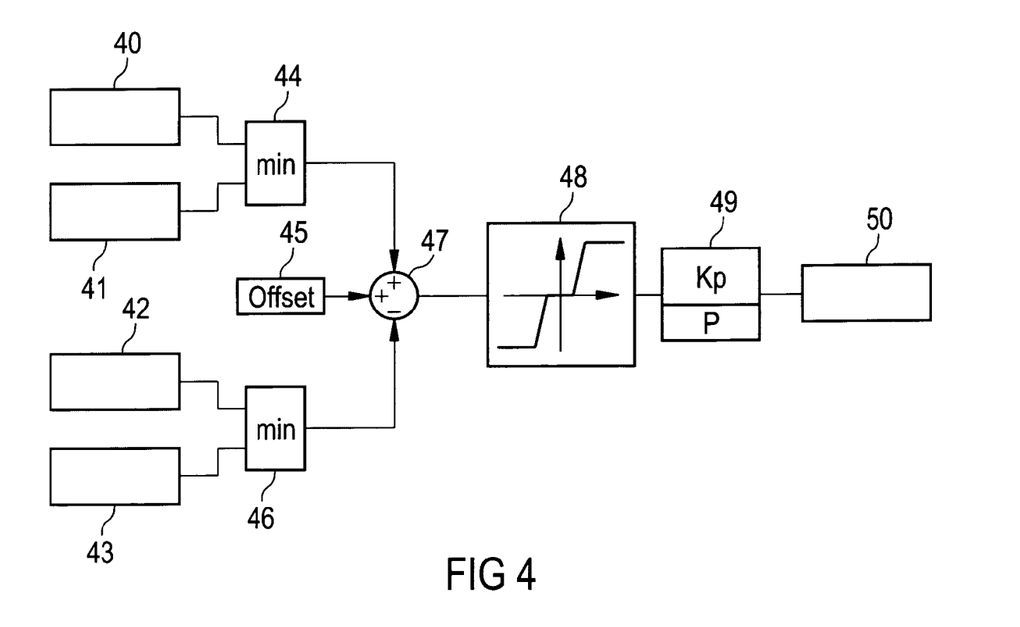
FIG. 4 is a diagrammatic representation of a method for calculating the speed of the trim adjustment valve.

FIG. 4 shows a method for calculating the speed of the trim adjustment valve. Since the trim adjustment valve (reference numeral 13 in FIG. 1), which is controlled by the control device 10, may supply air to more than one heater (reference characters 1, 11 in FIG. 1) it is necessary, when calculating the switching speed of the trim adjustment valve, to use the lowest heater temperature and the lowest desired temperature in the different heaters. FIG. 4 shows the case of two heaters. First, in component 46, the lower of the two actual temperatures of the first heater 42 and of the second heater 43 is determined. Likewise, in component 44, the lower of the two actual temperatures of the first heater 40 and the second heater 41 is determined. After this, a comparison of the lower of the two desired temperatures with the lower of the two actual temperatures takes place in the comparator 47. An offset value 45 is added to the resulting error. This additional offset value 45 is e.g. 2° C. This ensures that in a stationary state of the heater, no power request from a control device to a corresponding regulating device takes place. Next, the speed at which the trim adjustment valve is controlled is calculated in the unit 48. In the subsequent proportional algorithm 49, the speed factor is calculated and is output as a desired speed value 50 of the trim adjustment valve.

One of the major disadvantages of these PID control methods is that, in the case of space air temperature regulation in an aircraft, as shown in FIG. 1, two regulating devices or actuators are used to set the temperature in a cell. This can lead to undesirable oscillations between the trim adjustment valve and the heater. Consequently, it may happen that both regulating devices are trying to increase the temperature in the cell, and as a result of this the temperature overshoots the set target, not least due to the heater's inertia.

Furthermore, known systems do not take account of the temperature of the air fed into the heater. A change in the temperature of the air introduced into the heater can thus lead to temperature fluctuations in the cabin or cell.

Figure 7:
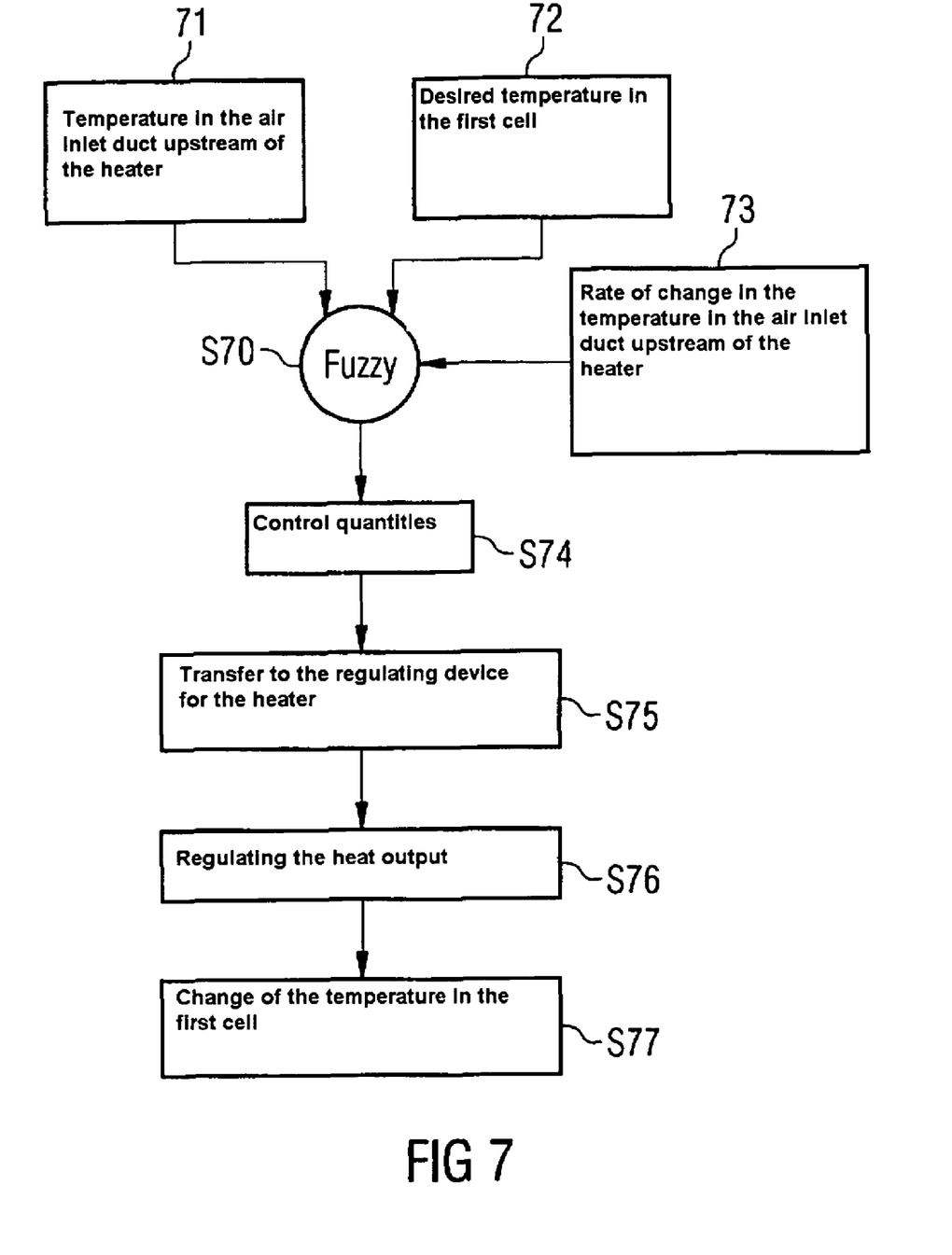
FIG. 7 shows a flow chart of a method according to an exemplary embodiment of the present invention.

FIG. 7 shows a flow chart of a method according to an exemplary embodiment of the present invention. In this arrangement, for the purpose of calculating control quantities by which the regulating devices are controlled, the method according to the invention makes use of non-linear fuzzy logic within a regulation circuit with the use of measured regulated quantities.

A regulator with fuzzy logic allocates each input sample to one or several quantities of a membership degree function. Thereafter, interference rules or selection rules for generating output values by means of the membership degree quantities of the input variables are used. The output quantities are then "defuzzified" in order to generate control output signals. Fuzzy decision parameters, for example membership degree functions, are optimised or matched in order to implement the desired regulating characteristics.

The method according to the invention regulates the temperature in a space comprising one or several cells, wherein regulation of the temperature takes place by way of a heating system comprising at least one regulating device. In the exemplary embodiment of the present invention, shown in FIG. 7, the temperature in the air inlet duct upstream of the heater 71, the desired temperature in the first cell 72, and the rate of change in the temperature in the air inlet duct upstream of the heater 73 are measured as regulated quantities. In this process, measuring of the three regulated quantities is carried out by the two temperature sensors 14, 16 (shown in FIG. 1). As the next step (S70), a control quantity for controlling the heater is calculated on the basis of the measured regulated quantities, wherein calculation of the control quantity is carried out by non-linear fuzzy logic with the use of the measured regulated quantities 71, 72, 73. In this arrangement, non-linear fuzzy logic used for calculating the control quantities is based on AND operations and centroid methods which are well known from the state of the art and are thus not discussed in further detail in this document.

After calculation of the control quantities in step S74, the calculated control quantities are transferred to the regulating device for the heater (S75). Subsequently, regulation of the heat output takes place in step S76, which regulation results in a change in the temperature in the first cell (S77).

The method shown relates to a feed-forward control system. Apart from the non-linearity of the fuzzy logic, the method shown is associated with a further advantage in that in particular the temperature in the air inlet duct upstream of the heater is taken into account. Thus e.g. temperature fluctuations in the air inlet duct upstream of the heater are detected in time so that the heater may regulate to compensate for them before a noticeable fluctuation in the cabin temperature occurs. The rate of change in the temperature in the air inlet duct upstream of the heater may be used as a further regulated quantity so that, for example, the heater does not heat while the trim adjustment valve is in a stabilisation phase. In this way it may be ensured that there is no interference between the two regulating devices (trim adjustment valve and heating regulator). For example, the system may be adjusted so that if the rate of change in the temperature in the air inlet duct upstream of the heater exceeds a certain value, the heat output is switched to zero.

In order to design this fuzzy block, the respective cell model or cabin model must be calculated in an open loop so that the input quantities of the fuzzy block are allocated to their respective membership degree functions. The control quantity which is output by the fuzzy control is the heat output of the heater, which output is to be set, in the unit PWM (Pulse Width Modulation).

Figure 5A:
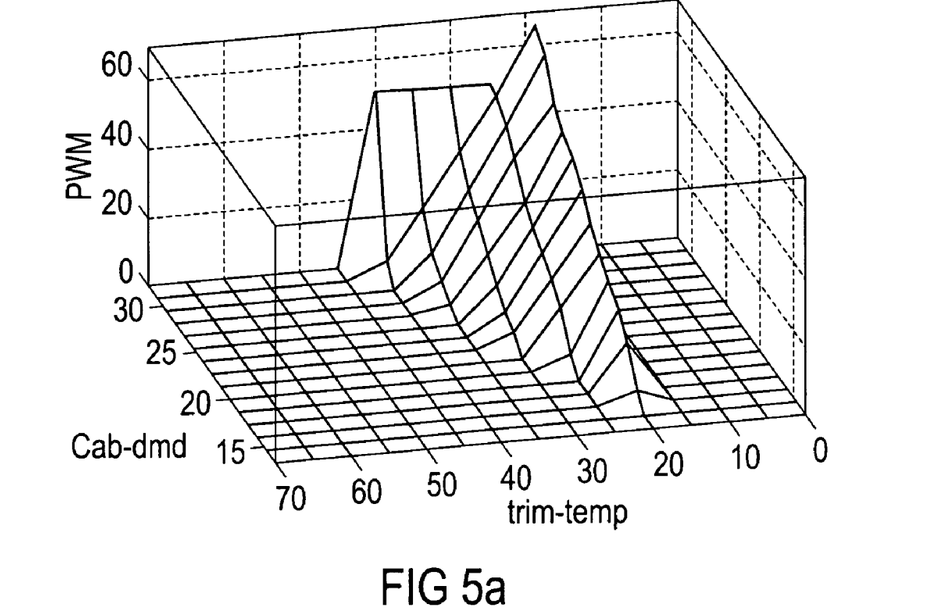
FIG. 5a is a three-dimensional representation of the relationship between the desired value of the cabin temperature, the temperature in the air inlet duct, and the control signal to the heater, according to an exemplary embodiment of the present invention.

FIG. 5a shows a 3-dimensional representation of the interrelationship between the desired value of the cabin temperature (Cab-dmd), the temperature in the air inlet duct (trim-temp), and the control signal to the heater or the heat output (PWM).

Figure 5B:
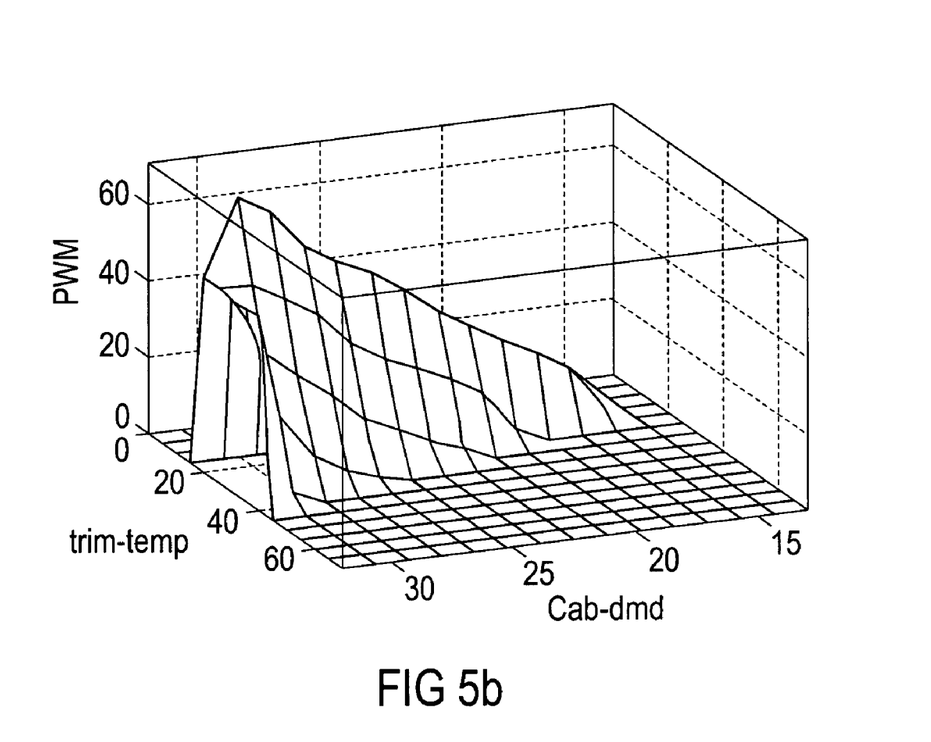
FIG. 5b shows the context of FIG. 5a in another perspective.

The interrelationship shown in FIGS. 5a and 5b is calculated with the use of Matlab/simulink.

FIG. 5b shows another perspective of the interrelationship shown in FIG. 5a. The area at which the PWM-value is zero is an area on which either the desired value cannot be set, for example because the temperature in the air inlet duct upstream of the heater is too high, or said area for example relates to a position at which the temperature in the air inlet duct upstream of the heater is too low and the desired value of the temperature in the first cell is too high.

Furthermore, regulation may be such that if the temperature approximates the desired value to a certain amount (for example to 2° C. or 5° C.), the control system ignores this deviation from the desired value, and the heat output is regulated back to zero.

Figure 8:
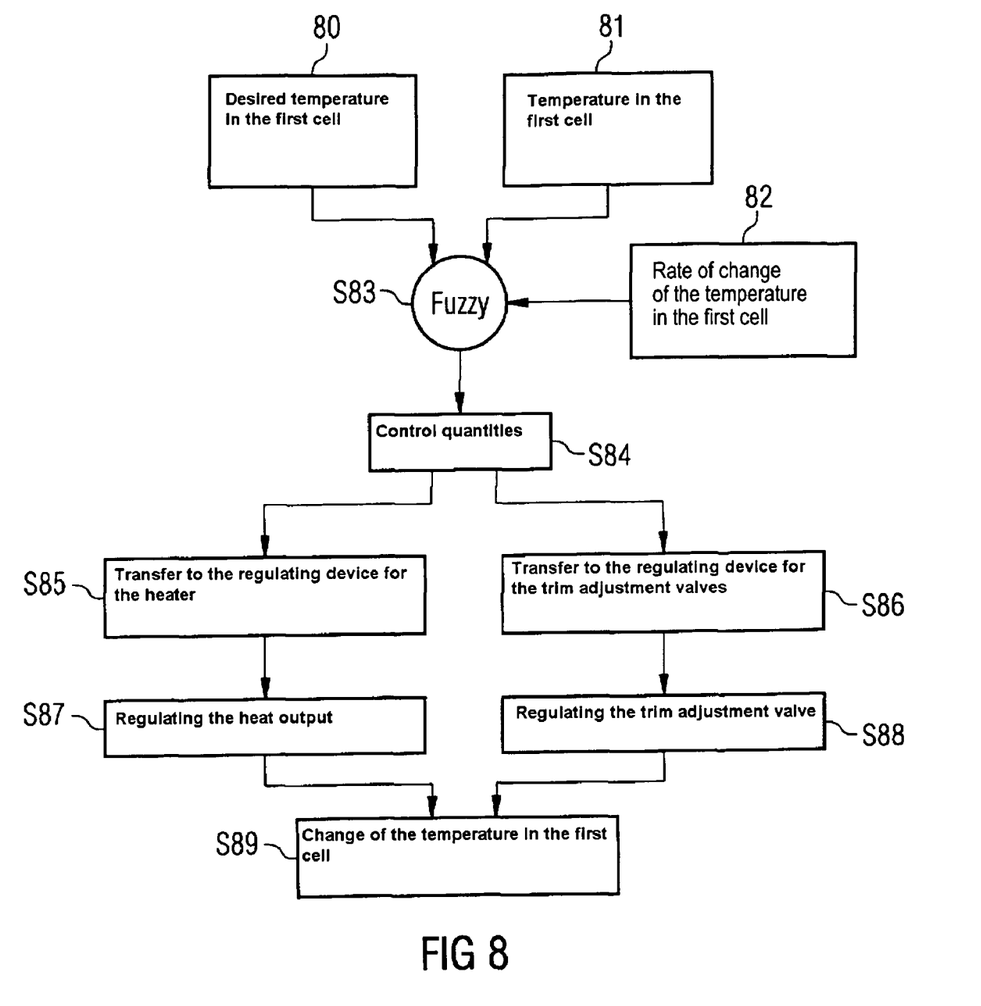
FIG. 8 shows a flow chart of another method according to another preferred exemplary embodiment of the present invention.

FIG. 8 shows a flow chart of another method according to another exemplary embodiment of the present invention. The method shown in FIG. 8 may be implemented as a second fuzzy block beside the first fuzzy block described in FIG. 7. In this arrangement the desired temperature in the first cell 80 (which is for example input by the aircrew by way of a user interface), the temperature in the first cell 81 (measured by way of sensor 16 in FIG. 1) and the rate of change in the temperature in the first cell 82 (also measured by way of sensor 16 in FIG. 1) are used as input quantities or regulated quantities. In step S83 the non-linear fuzzy logic then calculates the control quantities and in step S84 outputs the calculated control quantities.

Among other advantages, this embodiment is associated with an advantage in that a temporary fluctuation in the temperature within reach of the sensor 16 in the cabin is ignored under certain circumstances, namely for example if the rate of change is within a certain interval, or when the error (the difference between the desired temperature in the cabin and the measured temperature in the cabin) is within a certain corresponding error interval. This method is associated with a further advantage in that it provides the option of asymmetrical output values, i.e. asymmetrical output control quantities. This may be advantageous because the heater can only heat, it cannot cool. Within a PID-closed-loop regulation circuit such an asymmetrical control would not be possible since an error, in other words a difference between the desired value and the actual value, always results in the same output quantity, irrespective for example of the sign of the error.

The fuzzy block shown in FIG. 8 is designed to correct the error between the desired temperature in the first cell or cabin and the actual temperature in the cabin. The feed-forward function may be programmed such that the control quantity for the regulating device of the heater is set to zero if the error between the desired temperature and the actual temperature exceeds +/−1° C. In this case, a control quantity is transferred to the regulating device for the trim adjustment valve (S86), and the trim adjustment valve is regulated accordingly (S88), which leads to a change in the temperature in the first cell (S89). Furthermore, an interval window may be generated in which the control quantity for the regulating device for the heater is zero, for example between +3° C. and +1.5° C. and between −3° C. and −1.5° C. Furthermore, the rate of change in the temperature in the first cell 82 may be used for detecting whether a change in the cabin temperature is connected to a normal heating process, or whether it is due to interference, for example due to turbulence.

If the respective prerequisites are met (e.g. if the error is between −1° C. and +1° C.), a control quantity is transferred to the regulating device for the heater (S85), and the heat output is regulated accordingly (S87). This also results in a change in the temperature in the first cell (S89).

Figure 9:
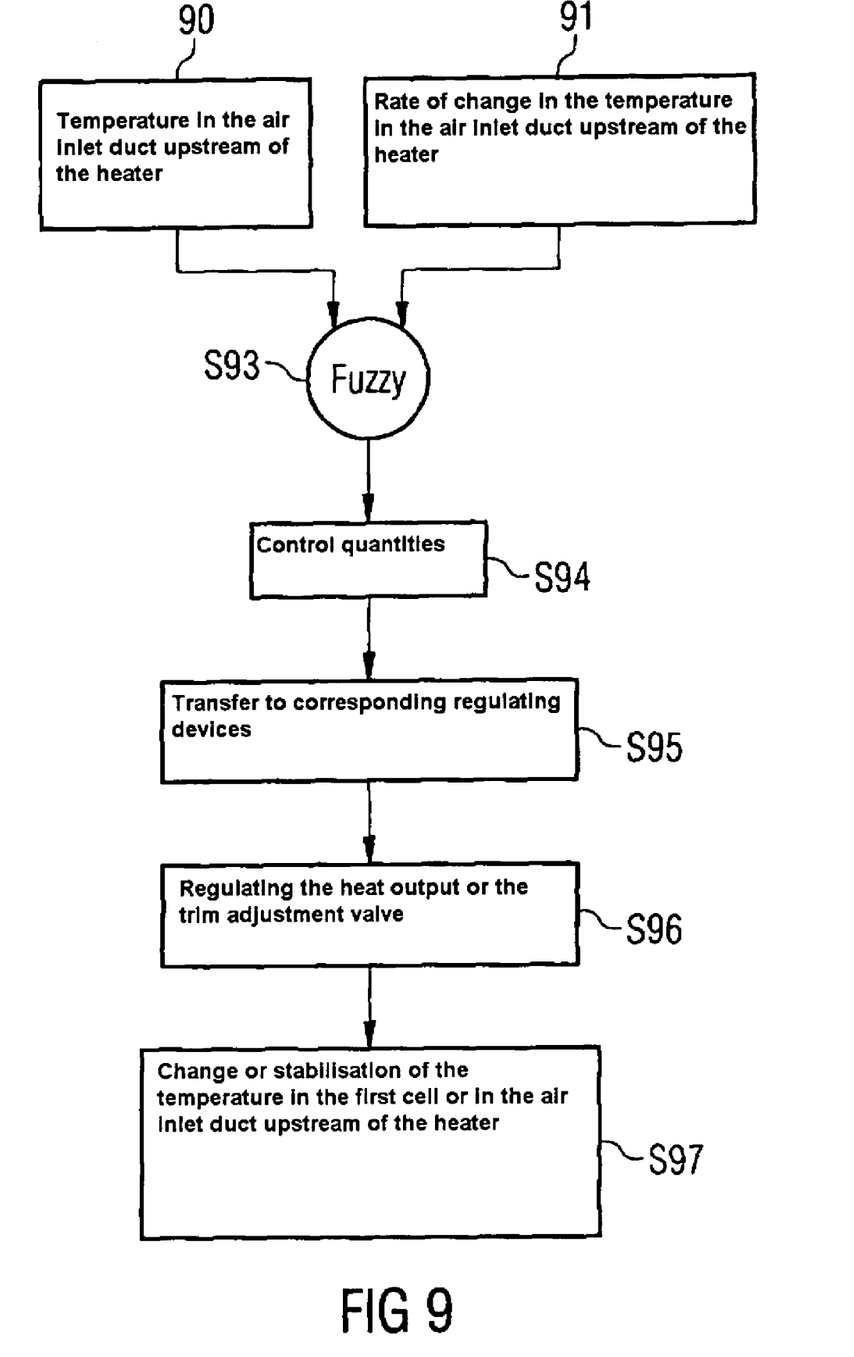
FIG. 9 shows a flow chart of a further method according to a further preferred exemplary embodiment of the present invention.

FIG. 9 shows a further flow chart of a method according to another exemplary embodiment of the present invention. This method may be implemented in the form of a third fuzzy block. In this arrangement the temperature in the air inlet duct upstream of the heater 90, and the rate of change in the temperature in the air inlet duct upstream of the heater 91 are measured. The measured values are then transferred to the fuzzy logic (S93). Advantageously, in this way an attenuation of the temperature in the cabin may be achieved if fluctuations in the temperature in the air inlet duct upstream of the heater occur. The output quantities of the non-linear fuzzy logic are output as control quantities (S94) and are transferred to the respective regulating devices (S95). This is followed by regulation of the heat output or of the trim adjustment valve (S96), and a change or stabilisation of the temperature in the first cell or of the temperature in the air inlet duct upstream of the heater (S97) takes place.

Figure 6:
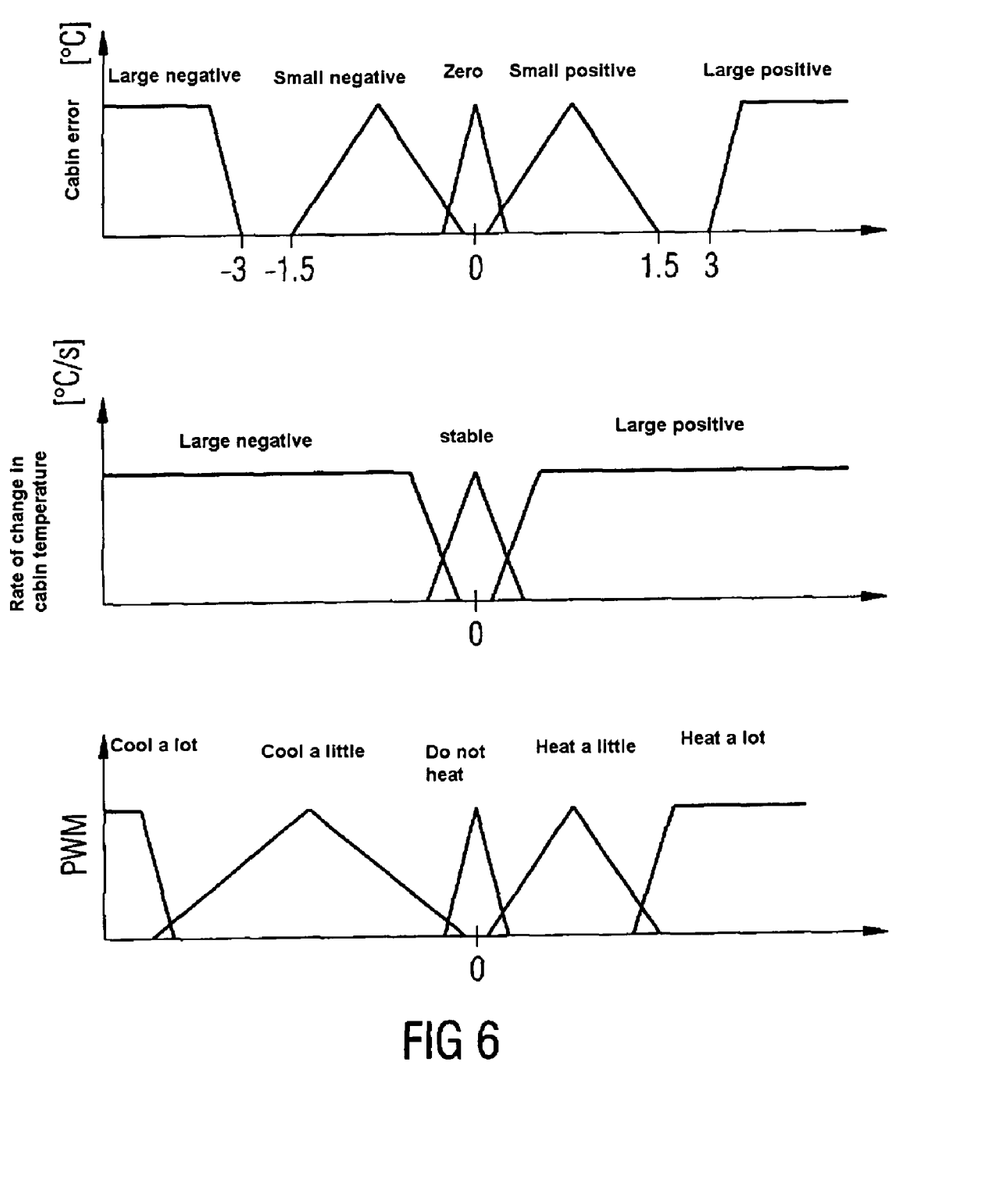
FIG. 6 shows a membership degree function according to an exemplary embodiment of the present invention.

FIG. 6 shows a membership degree function according to an exemplary embodiment of the present invention. A PWM for the heater is generated as an output, wherein said PWM may be added to a previously generated PWM. The previously generated PWM may for example be generated in the form of a feed-forward loop, as described in FIG. 7.

In order to describe the principle of a fuzzy block, which block in the way of input quantities or regulated quantities comprises the actual temperature in the cabin or in the first cell (in other words the cabin error) and the rate of change in the cabin temperature; and in the way of output quantity or control quantity comprises the heat output of the heater (PWM), FIG. 6 shows the membership degree functions of the two regulated quantities and of the control quantity. If the cabin error is between −1.5° C. and −3° C. or between 1.5° C. and 3° C., then the output PWM-value is zero. Thus, if the error in the cabin temperature is situated in a certain interval, it will not be considered in the closed-loop regulation circuit. It should be noted that in the exemplary embodiment shown, arbitrary interval thresholds have been selected. Of course, many other interval thresholds are also advantageous. Furthermore, it is possible to set an output PWM-value which corresponds to slight cooling or slight heating (cool a little, heat a little). In this way, an error in the temperature is corrected gently.

Furthermore, the membership degree functions of the cabin error are symmetrical in the vicinity of the value zero, however, the combined output membership degree functions (PWM) are asymmetrical. This means that a cabin error x and a cabin error (−x) do not lead to equal output values. Cabin errors <−3° C. are designated "large negative"; cabin errors between −1.5° C. and approximately −0° C. are designated "small negative"; cabin errors around 0° C. (for example between −0.5° C. and +0.5° C.) are designated "zero"; cabin errors between a slightly positive temperature and +1.5° C. are designated "small positive"; and cabin errors >3° C. are designated "large positive".

The rate of change in the cabin temperature is used as a filter, as shown by the following selection rules:

Rule 1: If the cabin error is "large negative" AND the rate of change in the cabin temperature is stable, then the PWM is "cool a lot";

Rule 2: If the cabin error is "small negative" AND the rate of change in the cabin temperature is "stable", then the PWM is "cool a little";

Rule 3: If the cabin error is "zero" AND the rate of change in the cabin temperature is "stable", then the PWM is "do not heat";

Rule 4: If the cabin error is "small positive" AND the rate of change in the cabin temperature is "stable", then the PWM "heat a little";

Rule 5: If the cabin error is "large positive" AND the rate of change in the cabin temperature is "stable", then the PWM is "heat a lot";

Rule 6: If the rate of change in the cabin temperature is "large negative", then the PWM is "do not heat";

Rule 7: If the rate of change in the cabin temperature is "large positive", then the PWM is "do not heat".

Only if the rate of change in the cabin temperature is assumed to be stable will the cabin error be translated into a corresponding heat output (PWM); otherwise the PWM-value is set to zero. Thus, if the temperature in the cabin starts to fluctuate due to an external disturbance, wherein this disturbance may be caused by the trim adjustment valve or the temperature of the air from the mixer (reference character 12 in FIG. 1), the heater does not additionally contribute to such fluctuations, but instead is switched off. According to this exemplary embodiment of the present invention, the rate of change in the temperature in the air inlet duct upstream of the heater may also be used as a further regulated quantity.

Furthermore, additional regulated quantities are imaginable, such as for example the altitude of the passenger aircraft or information on the length of time the engines of said aircraft have been running, or whether said engines have only just been started up. For example, if after a long and cold winter's night the engines are started up and the temperature regulating system thus becomes operative again after some time, it is imaginable that the outside temperature is used as the only regulated quantity, and that the regulating system will run at full heat output for a corresponding period, for example for five minutes, before further regulated quantities are used.

Moreover, according to a further exemplary embodiment of the present invention, the three different fuzzy blocks may be combined with each other. In this way, regulation of the temperature in a commercial aircraft may be implemented, which regulation, while complex, is fast and efficient. Furthermore, it should be noted that the regulating device shown in FIG. 1 comprises control devices 10, 17, which can for example be arranged in a common overall control device, wherein the overall control device comprises a processor on which a computer program is executable which instructs the processor to carry out the following operations: retrieving measured regulated quantities from the measuring devices 14, 15, 16, and calculating control quantities for controlling the regulating devices, e.g. trim adjustment valve 13, heater 1, on the basis of the measured regulated quantities. Calculation of the control quantities is performed by non-linear fuzzy logic within the closed-loop regulation circuit with the use of the measured regulated quantities. As a further operation, transfer of the calculated control quantities to one or both regulating devices is performed for regulating the temperature of the air which is introduced into the cells of the space, by the at least one regulating device with the use of the calculated control quantities.

Depending on whether the control circuit of any of the above control or regulating devices is a closed loop control or not, the control or regulating devices may be contemplated as controlling devices or regulating devices. The present invention encompasses both, the control and the regulation of the temperature with or without closed loop control.

It should be noted, that the term "comprising" does not exclude other elements or steps and the "a" or "an" does not exclude a plurality and that a single processor or system may fulfil the functions of several means recited in the claims. Also elements described in association with different embodiments may be combined.

It should also be noted, that any reference signs in the claims shall not be construed as limiting the scope of the claims.

The invention claimed is:

1. A method for controlling a temperature in a space in an aircraft, wherein the space includes at least one cell, wherein controlling the temperature is performed by means of a heating system with at least one controlling device, and wherein the method comprises:
   measuring set variables including a first rate of change of a first temperature in a first cell of the at least one cell;
   calculating control variables for controlling the at least one controlling device on the basis of the measured set variables, wherein calculating the control variables is performed by means of non-linear fuzzy logic within a control circuit with the use of the measured set variables;
   transferring the calculated control variables to the at least one controlling device;
   introducing a first air into the at least one cell; and
      controlling a second temperature of the first air which is introduced into the at least one cell by the at least one controlling device on the basis of the calculated control variables;

adjusting first and second air inlet rates of a second air from an air mixer and a third air from a bleed air compressor by means of a trim adjustment valve;

heating a fourth air from the trim adjustment valve by means of a heater; and switching to zero of a heat output of the heater if the rate of change in a third temperature in a first air inlet duct upstream of the heater exceeds a certain value.

2. The method of claim 1, further comprising:
controlling at least one of the first and second regulating devices by means of the at least on controlling device.

3. The method of claim 2, further comprising:
determining a first calculated control quantity;
controlling the first regulating device on the basis of the first calculated control quantity by means of the controlling device;
determining a second calculated control quantity; and
controlling the second regulating device on the basis of the second calculated control quantity by means of the controlling device.

4. The method of claim 1, wherein the set variables include at least one variable of a group of variables consisting of the third temperature in the first air inlet duct upstream of the heater, a fourth temperature within the heater, the first temperature in the first cell, a desired fifth temperature in the first cell, the first rate of change in the first temperature in the first cell, and a second rate of change in the third temperature in the first air inlet duct upstream of the heater.

5. The method of claim 4, further comprising calculating the set variables from the third temperature in the first air inlet duct upstream of the heater and from the desired fifth temperature in the first cell by means of a first fuzzy block.

6. The method of claim 5, further comprising calculating the set variables furthermore on the basis of the second rate of change in the third temperature in the first air inlet duct upstream of the heater in the first fuzzy block.

7. The method of claim 4, further comprising calculating the set variables on the basis of the first temperature in the first cell, the desired fifth temperature in the first cell, and the first rate of change in the first temperature in the first cell in a second fuzzy block.

8. The method of claim 4, further comprising calculating the set variables from the third temperature in the first air inlet duct upstream of the heater and the second rate of change in the third temperature in the first air inlet duct upstream of the heater in a third fuzzy block.

9. The method of claim 1, further comprising calculating the control variables on the basis of the set variables by using at least one of an AND operation and a centroid method in the non-linear fuzzy logic.

10. The method of claim 1, wherein temperatures and temperature rates of change are stored in first, second, and third fuzzy blocks, the method further comprising combining calculations of the first, second and third fuzzy blocks.

11. The method of claim 1 wherein the at least one cell is arranged within a pressure chamber of the aircraft; and
wherein the at least one cell encompasses at least one of a cockpit, a sanitary cell, a first seating area for aircrew and a second seating area for passengers.

12. A controlling apparatus for controlling a temperature in a space in an aircraft, wherein the space includes at least one cell, wherein the controlling apparatus comprises:
a heating system with at least one controlling device;
at least one sensor for measuring set variables including a first rate of change of a first temperature in a first cell of the at least one cell;
a processor for calculating control variables for controlling the at least one controlling device on the basis of the measured set variables;
a non-linear fuzzy logic;
wherein a calculation for calculating the control variables is performed by means of the non-linear fuzzy logic with the use of the measured set variables;
at least one data transmission means for the transfer of the calculated control variables to the at least one controlling device;
wherein the at least one controlling device is adapted for controlling a second temperature of a first air introduced into the at least one cell of the space on the basis of the calculated control variables;
a first regulating device;
a second regulating device;
wherein the first regulating device is a trim adjustment valve for controlling at least one of first and second air inlet rates of a second air from an air mixer and of a third air from a bleed air compressor;
wherein the second regulating device is a heater for heating a fourth air from the trim adjustment valve; and
wherein the heater is adapted to switch a heat output of the heater to zero if the rate of change in a third temperature in a first air inlet duct up stream of the heater exceeds a certain value.

13. The controlling apparatus of claim 12, wherein the heating system comprises:
a controller;
wherein the controller is adapted for controlling at least one of the trim adjustment valve and a heat output of the heater; and
wherein the set variables include at least one variable of a group of variables consisting of a third temperature in a first air inlet duct upstream of the heater, a fourth temperature within the heater, the first temperature in the first cell, a desired fifth temperature in the first cell, the first rate of change in the first temperature in the first cell, and a second rate of change in the third temperature in the first air inlet duct upstream of the heater.

14. The controlling apparatus of claim 12, further comprising a first fuzzy block, a second fuzzy block and a third fuzzy block;
wherein the non-linear fuzzy logic is adapted for calculating the control variables on the basis of the set variables by using at least one of an AND operation and a centroid method;
wherein the first fuzzy block is adapted for calculating the set variables from the third temperature in the first air inlet duct upstream of the heater or from the desired fifth temperature in the first cell or from a second rate of change in the third temperature in the first air inlet duct upstream of the heater;
wherein the second fuzzy block is adapted for calculating the set variables on the basis of the first temperature in the first cell, the desired fifth temperature in the first cell, and the first rate of change in the first temperature in the first cell;
wherein the third fuzzy block is adapted for calculating the set variables from the third temperature in the first air inlet duct upstream of the heater and the second rate of change in the third temperature in the first air inlet duct upstream of the heater; and
wherein the first, second and third fuzzy blocks are adapted for being combined with another.

15. A computer program on a computer readable medium for controlling a heating system with at least one controlling device for controlling the temperature in a space in an aircraft, wherein the space includes at least one cell, wherein the computer program, when it is executed on a processor of the heating system, causes the processor to:
measure set variables including a first rate of change of a first temperature in a first cell of the at least one cell;
calculate control variables for controlling the at least one controlling device on the basis of the measured set variables, wherein calculating the control variables is performed by means of non-linear fuzzy logic within a control circuit with the use of the measured set variables;
transfer the calculated control variables to the at least one controlling device;
introducing a first air into the at least one cell;
control a second temperature of the first air which is introduced into the at least one cell by the at least one controlling device on the basis of the calculated control variables;
adjusting first and second air inlet rates of a second air from an air mixer and a third air from a bleed air compressor by means of a first regulating device which is a trim adjustment valve;
heating a fourth air from the first regulating device by means of a second regulating device which is a heater; and
switching to zero of a heat output of the heater if the rate of change in a third temperature in a first air inlet duct upstream of the heater exceeds a certain value.

16. A method for controlling a temperature in a space in an aircraft, wherein the space includes at least one cell, wherein controlling the temperature is performed by means of a heating system with at least one controlling device, and wherein the method comprises:
measuring set variables including a first rate of change of a first temperature in a first cell of the at least one cell, wherein the set variables include at least one variable of a group of variables consisting of a third temperature in a first air inlet duct upstream of a heater, a fourth temperature within the heater, the first temperature in the first cell, a desired fifth temperature in the first cell, the first rate of change in the first temperature in the first cell, and a second rate of change in the third temperature in the first air inlet duct upstream of the heater;
calculating control variables for controlling the at least one controlling device on the basis of the measured set variables, wherein calculating the control variables is performed by means of non-linear fuzzy logic within a control circuit with the use of the measured set variables;
transferring the calculated control variables to the at least one controlling device;
introducing first air into the at least one cell;
controlling a second temperature of the first air which is introduced into the at least one cell by the at least one controlling device on the basis of the calculated control variables;
calculating the set variables from the third temperature in the first air inlet duct upstream of the heater and from the desired fifth temperature in the first cell by means of a first fuzzy block.

17. The method of claim 16, further comprising calculating the set variables furthermore on the basis of the second rate of change in the third temperature in the first air inlet duct upstream of the heater in the first fuzzy block.

18. A method for controlling a temperature in a space in an aircraft, wherein the space includes at least one cell, wherein controlling the temperature is performed by means of a heating system with at least one controlling device, and wherein the method comprises:
measuring set variables including a first rate of change of a first temperature in a first cell of the at least one cell, wherein the set variables include at least one variable of the group of variables consisting of a third temperature in a first air inlet duct upstream of a heater, a fourth temperature within the heater, the first temperature in the first cell, a desired fifth temperature in the first cell, the first rate of change in the first temperature in the first cell, and a second rate of change in the third temperature in the first air inlet duct upstream of the heater;
calculating control variables for controlling the at least one controlling device on the basis of the measured set variables, wherein calculating the control variables is performed by means of non-linear fuzzy logic within a control circuit with the use of the measured set variables;
transferring the calculated control variables to the at least one controlling device;
introducing first air into the at least one cell;
controlling a second temperature of the first air which is introduced into the at least one cell by the at least one controlling device on the basis of the calculated control variables;
calculating the set variables on the basis of the first temperature in the first cell, the desired fifth temperature in the first cell, and the first rate of change in the first temperature in the first cell in a second fuzzy block.

19. A method for controlling a temperature in a space in an aircraft, wherein the space includes at least one cell, wherein controlling the temperature is performed by means of a heating system with at least one controlling device, and wherein the method comprises:
measuring set variables including a first rate of change of a first temperature in a first cell of the at least one cell, wherein the set variables include at least one variable of the group of variables consisting of a third temperature in a first air inlet duct upstream of a heater, a fourth temperature within the heater, the first temperature in the first cell, a desired fifth temperature in the first cell, the first rate of change in the first temperature in the first cell, and a second rate of change in the third temperature in the first air inlet duct upstream of the heater;
calculating control variables for controlling the at least one controlling device on the basis of the measured set variables, wherein calculating the control variables is performed by means of non-linear fuzzy logic within a control circuit with the use of the measured set variables;
transferring the calculated control variables to the at least one controlling device;
introducing first air into the at least one cell;
controlling a second temperature of the first air which is introduced into the at least one cell by the at least one controlling device on the basis of the calculated control variables;
calculating the set variables from the third temperature in the first air inlet duct upstream of the heater and the second rate of change in the third temperature in the first air inlet duct upstream of the heater in a third fuzzy block.

20. A controlling apparatus for controlling a temperature in a space in an aircraft, wherein the space includes at least one cell, wherein the controlling apparatus comprises:
a heating system with at least one controlling device;
at least one sensor for measuring set variables including a first rate of change of a first temperature in a first cell of the at least one cell;
a processor for calculating control variables for controlling the at least one controlling device on the basis of the measured set variables;
a non-linear fuzzy logic;
wherein a calculation for calculating the control variables is performed by means of the non-linear fuzzy logic with the use of the measured set variables;
at least one data transmission means for the transfer of the calculated control variables to the at least one controlling device;
wherein the at least one controlling device is adapted for controlling a second temperature of first air introduced into the at least one cell of the space on the basis of the calculated control variables;
a first fuzzy block, a second fuzzy block and a third fuzzy block;
wherein the non-linear fuzzy logic is adapted for calculating the control variables on the basis of the set variables by using at least one of an AND operation and a centroid method;
wherein the first fuzzy block is adapted for calculating the set variables from a third temperature in the first air inlet duct upstream of the heater or from a desired fifth temperature in the first cell or from a second rate of change in the third temperature in the first air inlet duct upstream of the heater;
wherein the second fuzzy block is adapted for calculating the set variables on the basis of the first temperature in the first cell, the desired fifth temperature in the first cell, and the first rate of change in the first temperature in the first cell;
wherein the third fuzzy block is adapted for calculating the set variables from the third temperature in the first air inlet duct upstream of the heater and the second rate of change in the third temperature in the first air inlet duct upstream of the heater; and
wherein the first, second and third fuzzy blocks are adapted for being combined with another.

* * * * *

UNITED STATES PATENT AND TRADEMARK OFFICE
CERTIFICATE OF CORRECTION

PATENT NO. : 7,337,623 B2
APPLICATION NO. : 11/020895
DATED : March 4, 2008
INVENTOR(S) : Jean Remy Fauret It is certified that error appears in the above-identified patent and that said Letters Patent is hereby corrected as shown below:

Col. 1, line 15 "for example" should read --, for example,--.
Col. 2, lines 66 and 67 "for example" should read --, for example,--.
Col. 3, line 44 delete "," after "output".
Col. 4, line 23 "for example" should read --, for example,--.
Col. 6, line 29 "not least" should read --not the least--.
Col. 7, line 21 "stabilisation" should read --stabilization--.
Col. 8, lines 56 and 57 "stabilisation" should read --stabilization--.
Col. 10, line 38 delete "," after "noted".
Col. 10, line 41 "fulfil" should read --fulfill--.
Col. 11, line 11 "on" should read --one--.
Col. 11, line 56 insert --,-- after "claim 1".
Col. 12, line 25 "up stream" should read --upstream--.
Col. 12, line 67 "with another" should read --with one another--.
Col. 16, line 23 "with another" should read --with one another--.

Signed and Sealed this

Second Day of June, 2009

JOHN DOLL
*Acting Director of the United States Patent and Trademark Office*